United States Patent [19]

Long et al.

[11] 4,216,087

[45] Aug. 5, 1980

[54] SCRUBBER SCALE PREVENTION

[75] Inventors: Ray S. Long, Walnut Creek; John B. Siemak, Concord, both of Calif.

[73] Assignee: The Dow Chemical Company, Midland, Mich.

[21] Appl. No.: 970,707

[22] Filed: Dec. 18, 1978

[51] Int. Cl.$^2$ .............................................. C02G 5/06
[52] U.S. Cl. ......................................... 210/58; 252/82; 252/86; 252/175; 252/180; 134/41; 422/13; 422/16
[58] Field of Search ................... 252/86, 82, 180, 175, 252/189; 210/38, 58; 134/41; 422/13, 16

[56] References Cited

U.S. PATENT DOCUMENTS

| | | | |
|---|---|---|---|
| 2,240,957 | 5/1941 | Munz | 210/58 X |
| 2,609,390 | 9/1952 | Bersworth | 252/180 X |
| 2,877,848 | 3/1959 | Case | 252/180 X |
| 3,214,454 | 10/1965 | Blazer | 252/180 X |
| 3,234,124 | 2/1966 | Irani | 210/38 |
| 3,336,221 | 8/1967 | Ralston | 210/58 |
| 3,447,965 | 6/1969 | Teurac | 252/82 X |
| 3,833,508 | 9/1974 | Austin et al. | 252/82 X |
| 3,981,779 | 9/1976 | Block | 252/180 X |
| 4,118,318 | 10/1978 | Welder et al. | 210/58 |

OTHER PUBLICATIONS

McIlvaine Scrubber Manual, vol. IV, 6/78.

*Primary Examiner*—Mayer Weinblatt
*Attorney, Agent, or Firm*—G. D. Street; J. W. Ambrosius

[57] ABSTRACT

The present invention concerns a method of inhibiting or controlling calcium scale deposition in $SO_2$ flue gas scrubbers which comprises scrubbing said flue gases with an aqueous composition comprising concentrated sodium hydroxide and a 2-hydroxyethyl iminodiacetate calcium inhibitor.

12 Claims, No Drawings

SCRUBBER SCALE PREVENTION

BACKGROUND

Standards limiting $SO_2$ emissions from flue gases produced by burning high sulfur content crude oils (e.g., 0.5–4.0%) in steam generators and other applications have been established and economical processes for removing $SO_2$ are needed. One of the more economical methods of meeting these standards comprises scrubbing the gas in a gas-liquid scrubber using an alkaline pH adjusted solution. Sodium hydroxide is typically used to maintain the alkaline concentration of the solution, with make-up water from available sources being needed to replace evaporative and blowdown losses. Removal efficiencies vary, depending upon the scrubber design, sulfur content of fuel, pH/concentration of recycle liquor, etc., but typically run 85–98% with the pH of the recycle liquor usually being in the 6.0–7.0 range.

However, utilization of available water sources to supply make-up water usually presents scaling problems, the high calcium content producing a scale in the form of $CaSO_4$ (the most difficult type of scale to remove), $CaSO_3$ (which can be removed by acid washing), and $CaCO_3$ (which occurs if the water pH is too high (e.g., above about 8.0). These scales build up in the scrubber requiring periodic shutdown and cleaning.

A solution most commonly used by oil companies to prevent such scaling problems is the use of a water softener to supply a low-hardness water to the steam boiler and meet the water-supply demands of the scrubber. These procedures are, however, costly as additional equipment, maintenance, etc., is required thereby.

An alternative solution is the addition of scale inhibitors to the make-up water that supplies the scrubbers. However, this procedure suffers the disadvantages in that additional feed equipment must be set up and that the feed must be monitored. Additionally, many of these inhibitors, e.g., calcium chelating agents, are of very limited solubility in concentrated sodium hydroxide solutions generally used to maintain an alkaline pH in the scrubber, thus requiring a two-step treatment or the uneconomical use of very dilute caustic solutions.

It would therefore be desirable to provide an effective scale inhibitor having good solubility in concentrated solutions of sodium hydroxide, thereby allowing a one-step addition of caustic and scale inhibitor to the scrubber, as well as the economical shipment of concentrated inhibitor-containing caustic solutions.

SUMMARY OF THE INVENTION

According to the present invention, it has been discovered that a concentrated sodium hydroxide solution containing a calcium inhibitor having a high degree of solubility therein can be employed in the gas scrubbing of $SO_2$-containing flue gases to maintain the requisite alkalinity and to control or prevent undesired calcium scaling therein. The high degree of the 2-hydroxyethyl iminodiacetate calcium inhibitor in the concentrated sodium hydroxide obviates the need for a two-step treatment method and necessary inhibitor metering equipment, and provides for the economical shipment and use of highly concentrated caustic solutions containing the calcium inhibitor.

DETAILED DESCRIPTION

The present invention comprises, in one aspect, a method of inhibiting calcium scaling in scrubbers used to remove $SO_2$ from flue gas which method comprises contacting said $SO_2$-containing flue gas in a scrubber with a calcium-containing aqueous composition comprising concentrated sodium hydroxide and a 2-hydroxyethyl iminodiacetate calcium inhibitor. The aqueous composition used in the scrubber is generally maintained at a pH of from about 5.5 to about 7.5, preferably from about 6.0 to about 7.0. The term "concentrated sodium hydroxide" as used in the specification and claims, includes compositions of from about 45 to about 50 wt. % sodium hydroxide. Preferably, the range is from about 46 to about 50 wt. %, with a 50 wt. % sodium hydroxide solution being highly prefered for use in the present invention. The term "inhibiting or preventing calcium scaling" means the inhibition or prevention of the precipitation of scale-forming calcium salts in a water system, such as used in an $SO_2$ scrubber.

In another embodiment, the invention comprises a method of inhibiting calcium scaling in scrubbers used to remove $SO_2$ from flue gases which comprises contacting said flue gas in a scrubber with a calcium-containing aqueous stream mixed with an aqueous solution comprising (a) a concentrated sodium hydroxide and (b) a 2-hydroxyethyl iminodiacetate calcium inhibitor, (a) being used in a sufficient amount to maintain the pH of the aqueous stream between about 5.5 and about 7.5 and (b) being used in a sufficient amount to control calcium scaling in said scrubber.

The 2-hydroxyethyl iminodiacetate calcium inhibitor is a known compound and is commercially available in an aqueous salt form of up to about 35 wt. % active ingredient. An aqueous solution of 2-hydroxyethyl iminodiacetate-disodium salt is preferred for use in the present invention and is available under the trade name EDG ®, from W. R. Grace & Co. The calcium inhibitor has an unexpected degree of solubility in concentrated caustic solutions, being soluble up to about 18% by weight in 50 wt. % caustic, whereas most known calcium inhibitors have a solubility in 50 wt. % caustic of about 1% or less. A stoichiometric amount of the calcium inhibitor, as used in the specification and claims, means the amount necessary to chelate a given quantity of equivalent calcium, present as a calcium salt, such as $CaCO_3$, $CaSO_4$, etc., present in the feed water being used in the scrubber. For example, the chelation value for one gram of a 26-27% solution of the 2-hydroxyethyl iminodiacetate inhibitor is about 125 mg of $CaCO_3$.

As those skilled in the art will recognize, the amount of calcium in feed waters will vary from time to time and from place to place. The method of the present invention is thus particularly effective for use with feed waters having about 125 parts per million (ppm) or less calcium per gallon of water. Where the feed water has a higher calcium level, additional quantities of the inhibitor will be required. However, use of large amounts of the inhibitor, where the calcium level exceeds about 125 ppm/gallon, becomes prohibitively expensive and it will be readily apparent that the preferred use of the invention will be for the treatment of water having about 125 ppm or less of calcium, particularly $CaCO_3$, per gallon. At such levels, prevention of calcium scaling can be attained whereas, at higher rates, only partial control or inhibition can be achieved.

Typically, a concentrated sodium hydroxide solution containing from about 0.3 to about 3.0% by weight of the active 2-hydroxyethyl iminodiacetate inhibitor is used in the method of the present invention. Preferably, a 50 wt. % sodium hydroxide solution containing from about 0.3 to 3.0% by weight 2-hydroxyethyl iminodiacetate inhibitor is employed in the method of the present invention. The sodium hydroxide-calcium inhibitor solution is conveniently prepared as a pre-mixed solution prior to shipment to the scrubber site for use.

The best mode presently known for carrying out the invention appears to comprise the treatment of a scrubber feed water having a calcium content of about 125 ppm or less with a 50 wt. % concentrated sodium hydroxide solution containing the disodium salt of a 2-hydroxyethyl iminodiacetate calcium inhibitor, sufficient amounts of the sodium hydroxide solution being added to maintain the feed water pH at about 6.0–7.0 and to provide at least a stoichiometric amount of the calcium inhibitor to prevent calcium precipitation and scaling of the scrubber.

Determination of the amount of calcium inhibitor needed for a typical operation is hereafter illustrated. In such operation, a feed water, having about 100 ppm $CaCO_3$ per gallon, is fed through an $SO_2$ scrubber at a rate of 1 gallon per minute (gpm). About 0.1 gpm of 50% sodium hydroxide solution is required to maintain the desired alkalinity demand of the scrubber solution during the scrubbing of the $SO_2$-containing flue gas passed therethrough. The calculations necessary to determine the amount of active 2-hydroxyethyl iminodiacetate (using a 26–27% by wt. solution thereof in water and having a chelation value per gram (gm) of solution of about 125 mg $CaCO_3$) to be included in the sodium hydroxide solution are as follows:

A. $CaCO_3$ Content of Water Feed/Min (1.0 gpm) (3785 ml/gal) (1.0 gm/ml) (100 ppm/$10^6$)=0.379 gm/min or 379 mg $CaCO_3$/min.

B. Stoichiometric Amount of Calcium Inhibitor Needed For Complete Control and Prevention of Calcium Scaling 379 mg $CaCO_3$/min 125 mg $CaCO_3$ chelation value/gm inhibitor=3.03 gm/min. Ca Inhibitor C. Flow Rate per Minute of 50% Sodium Hydroxide (0.1 gpm) (3785 ml/gal) (1.53 gm/ml)=579 gm caustic/min.

D. Wt. % Active Ca Inhibitor Needed in 50% Sodium Hydroxide $$\frac{3.03}{579} \times 100 = 0.52\% \text{ by wt.}$$

A 50,000 lb. load of 50% sodium hydroxide containing the required amount of calcium inhibitor would thus contain 260 lbs. of active calcium inhibitor:

$$50{,}000 \text{ lbs.} \times \frac{0.52}{100}$$

and 49,740 lbs. of 50 wt. % sodium hydroxide.

Based on the foregoing illustrative example and the teachings of the specification, those skilled in the art will be able to calculate the amount of calcium inhibitor needed for a given operation by analagous procedures.

What is claimed is:

1. A method of controlling calcium scaling in scrubbers used to remove $SO_2$ from flue gases which comprises contacting, in a scrubber, said flue gas with an aqueous stream containing calcium and comprising an amount of a concentrated sodium hydroxide solution sufficient to maintain the pH of said stream between about 5.5 and about 7.5 and an amount of a 2-hydroxyethyl iminodiacetate calcium inhibitor sufficient to control calcium scaling in said scrubber.

2. The method of claim 1 wherein the concentrated sodium hydroxide solution comprises 50 wt. % sodium hydroxide.

3. The method of claim 1 wherein the amount of concentrated sodium hydroxide solution employed is sufficient to maintain the pH of said stream between about 6.0 and about 7.0.

4. The method of claim 3 wherein the concentrated sodium hydroxide solution comprises 50 wt. % sodium hydroxide.

5. The method of claim 1 wherein said aqueous stream contains about 125 ppm calcium or less per gallon and at least a stoichiometric amount of said inhibitor necessary to prevent calcium scaling in said scrubber is employed.

6. The method of claim 5 wherein the concentrated sodium hydroxide solution comprises 50 wt. % sodium hydroxide and sufficient amounts thereof are employed to maintain the pH of said stream between about 6.0 and about 7.0.

7. A method of controlling calcium scaling in scrubbers used to remove $SO_2$ from flue gases which comprises contacting said flue gas in a scrubber with a calcium-containing aqueous stream mixed with an aqueous solution comprising (a) a concentrated sodium hydroxide and (b) a 2-hydroxyethyl iminodiacetate calcium inhibitor, (a) being used in a sufficient amount to maintain the pH of the aqueous stream between about 5.5 and about 7.5 and (b) being used in a sufficient amount to control calcium scaling in said scrubber.

8. The method of claim 7 wherein the concentrated sodium hydroxide solution comprises 50 wt. % sodium hydroxide.

9. The method of claim 7 wherein the amount of concentrated sodium hydroxide solution employed is sufficient to maintain the pH of said stream between about 6.0 and about 7.0.

10. The method of claim 9 wherein the concentrated sodium hydroxide solution comprises 50 wt. % sodium hydroxide.

11. The method of claim 7 wherein said aqueous stream contains about 125 ppm $CaCO_3$ or less per gallon and at least a stoichiometric amount of said inhibitor necessary to prevent calcium scaling in said scrubber is employed.

12. The method of claim 11 wherein the concentrated sodium hydroxide solution comprises 50 wt. % sodium hydroxide and sufficient amounts thereof are employed to maintain the pH of said stream between about 6.0 and about 7.0.

* * * * *